United States Patent
Kang

(10) Patent No.: US 8,369,035 B2
(45) Date of Patent: Feb. 5, 2013

(54) APPARATUS FOR ADJUSTING POSITION OF OPTICAL ELEMENT

(75) Inventor: Yoon-seok Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 13/193,784

(22) Filed: Jul. 29, 2011

(65) Prior Publication Data

US 2012/0105985 A1    May 3, 2012

(30) Foreign Application Priority Data

Oct. 28, 2010    (KR) .................. 10-2010-0106028

(51) Int. Cl.
*G02B 7/02* (2006.01)
*G02B 15/14* (2006.01)

(52) U.S. Cl. .................. 359/822; 359/694; 359/704

(58) Field of Classification Search .......... 359/694–704, 359/811–830
See application file for complete search history.

(56) References Cited

U.S. PATENT DOCUMENTS 7,573,652 B2 * 8/2009 Tsai .............................. 359/696
7,986,475 B2 * 7/2011 Lin et al. ........................ 359/822

* cited by examiner

*Primary Examiner* — Mohammed Hasan
(74) *Attorney, Agent, or Firm* — Drinker Biddle & Reath LLP

(57) ABSTRACT

An apparatus for adjusting a location of an optical element includes: a first barrel having a hollow cylindrical shape; a second barrel having a hollow cylindrical shape to support the optical element and rotatably coupled to the first barrel; a distance maintaining unit installed between the first barrel and the second barrel in a first region of the first barrel and maintaining a distance between the first barrel and the second barrel in the first region when the second barrel rotates relative to the first barrel; and a guiding unit installed between the first barrel and the second barrel in a second region of the first barrel and guiding a movement of the second barrel to change a relative position of the second barrel with respect to the first barrel in the second region when the second barrel rotates relative to the first barrel.

15 Claims, 7 Drawing Sheets

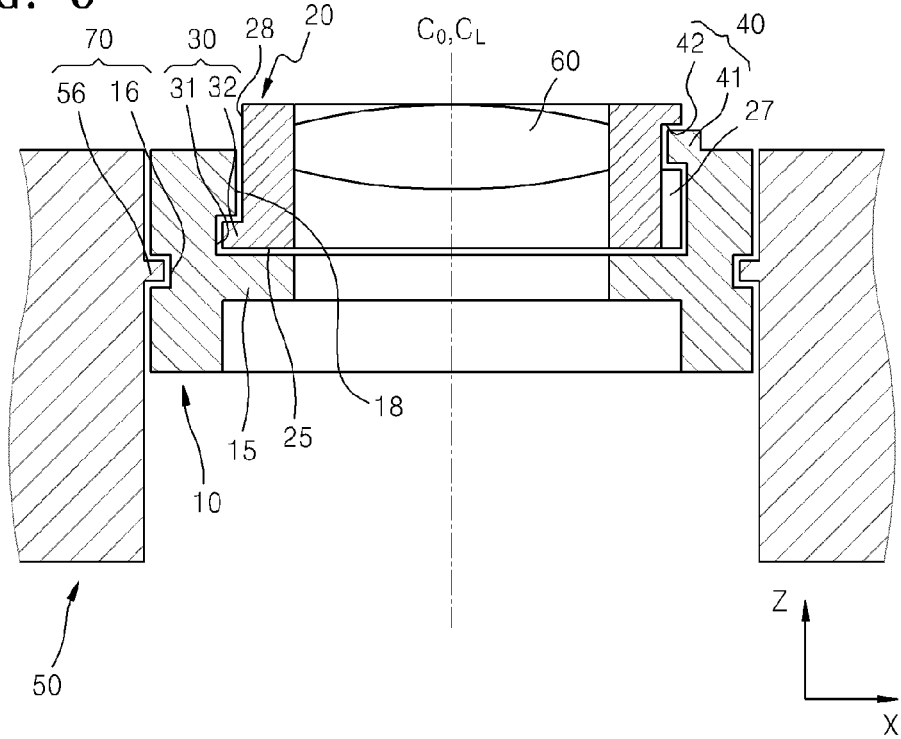
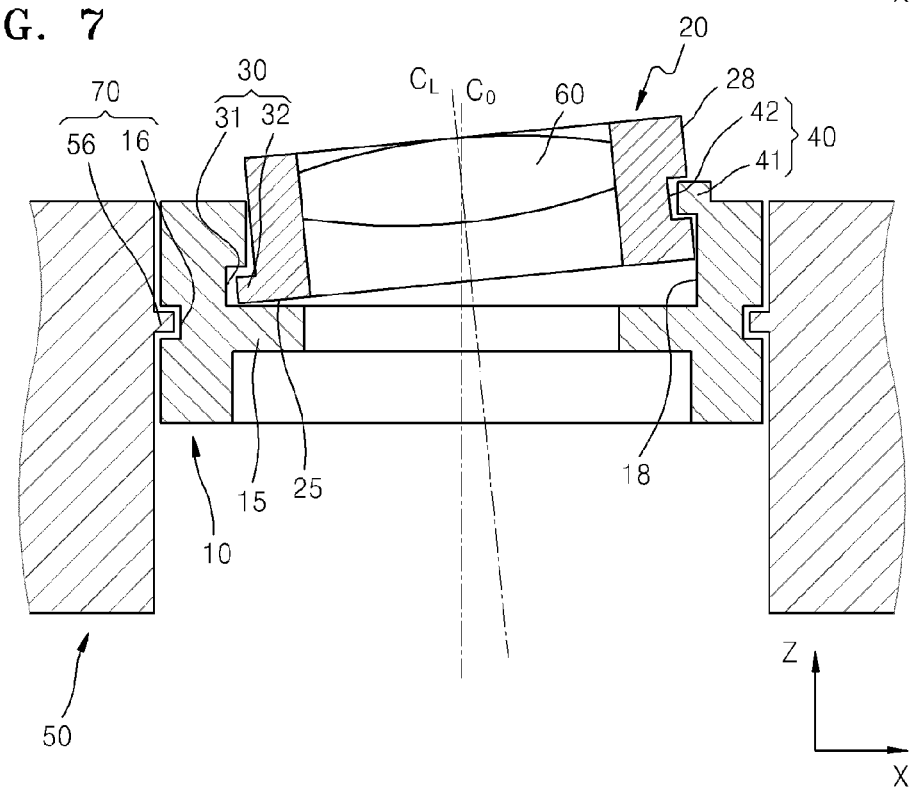

APPARATUS FOR ADJUSTING POSITION OF OPTICAL ELEMENT

CROSS-REFERENCE TO RELATED PATENT APPLICATION

This application claims the benefit of Korean Patent Application No. 10-2010-0106028, filed on Oct. 28, 2010, in the Korean Intellectual Property Office, the entire disclosure of which is incorporated herein by reference.

BACKGROUND

1. Field of the Invention

The invention relates to an apparatus for adjusting a position of an optical element, and more particularly, to an apparatus for precisely adjusting a position of an optical element, the apparatus including a distance maintaining unit and a guiding unit.

2. Description of the Related Art

In an optical system having optical elements such as a lens or an optical filter, it is essential to precisely adjust positions of the optical elements after the optical elements are assembled. In a precision optical system, it is difficult to achieve satisfactory optical performance by simply assembling optical elements.

When an optical system is assembled, an error in axial positions of lenses may occur due to weight of lenses or position deviation of other parts of the optical system, or a central axis of a lens may deviate from or be inclined with respect to an optical axis. Accordingly, in order to improve the resolution of the optical system, after the optical system is assembled, in general, the tilt of the lens is adjusted, a central axis of the lens is adjusted to coincide with an optical axis, or focusing is performed.

Such an operation for adjusting a position of a lens is quite complex. Also, additional mechanical equipment using set screws, washers, or springs may need to be attached to the optical system in order to adjust the position of the lens, thereby increasing the size and complexity of the optical system.

SUMMARY

According there is a need in the art for an apparatus for adjusting a position of an optical element, the apparatus including: a first barrel having a hollow cylindrical shape; a second barrel having a hollow cylindrical shape to support the optical element and rotatably coupled to the first barrel; a distance maintaining unit installed between the first barrel and the second barrel in a first region of the first barrel and maintaining a distance between the first barrel and the second barrel in the first region when the second barrel rotates relative to the first barrel; and a guiding unit installed between the first barrel and the second barrel in a second region of the first barrel and guiding a movement of the second barrel to change a relative position of the second barrel with respect to the first barrel in the second region when the second barrel rotates relative to the first barrel.

The second barrel may be rotatably coupled to an inner wall surface of the first barrel, the distance maintaining unit may include distance maintaining grooves extending in a circumferential direction in the inner wall surface of the first barrel and distance maintaining protrusions protruding from an outer wall surface of the second barrel to be inserted into the distance maintaining grooves, and the guiding unit may include guiding protrusions protruding from the inner wall surface of the first barrel and an inclined groove obliquely extending in the outer wall surface of the second barrel to be engaged with the guiding protrusions.

A plurality of the distance maintaining grooves and a plurality of the guiding protrusions may be each spaced apart from one another along the inner wall surface of the first barrel, and the second barrel may include receiving grooves extending along the outer wall surface of the second barrel to receive remaining ones of the guiding protrusions which are not engaged with the inclined groove.

The inclined groove may be inclined with respect to an axial direction of the second barrel.

The guiding protrusions may be inclined according to an inclination direction in which the inclined groove is inclined.

The first barrel may further include a jaw portion protruding inward from the inner wall surface to extend in the circumferential direction, and supporting an end surface of the second barrel.

The second barrel may further include an introduction groove formed in the outer wall surface of the second barrel and having a first end connected to an end portion of the inclined groove and a second end opened at an end surface of the second barrel.

The first barrel may further include insertion grooves extending in an axial direction of the first barrel to guide movements of the distance maintaining protrusions when the second barrel is coupled to the first barrel, and first ends of the distance maintaining grooves are connected to the insertion grooves.

The apparatus may further include: a third barrel disposed outside the first barrel and rotatably supporting the first barrel; and an axial direction adjusting unit installed between the first barrel and the third barrel and changing a relative position of the first barrel with respect to the third barrel when the first barrel rotates relative to the third barrel.

The axial direction adjusting unit may include axial direction adjusting grooves extending in an outer wall surface of the first barrel to be inclined with respect to an axial direction of the first barrel, and axial direction adjusting protrusions formed on the third barrel to be inserted into the axial direction adjusting grooves.

The axial direction adjusting unit may include axial direction adjusting grooves extending in an inner wall surface of the third barrel to be inclined with respect to an axial direction of the third barrel, and axial direction adjusting protrusions formed on the first barrel to be inserted into the axial direction adjusting grooves.

The second barrel may be rotatably coupled to the inner wall surface of the first barrel, the distance maintaining unit may include distance maintaining grooves extending in the circumferential direction in the outer wall surface of the second barrel and distance maintaining protrusions protruding from the inner wall surface of the first barrel to be inserted into the maintaining grooves, and the guiding unit may include guiding protrusions protruding from the inner wall surface of the first barrel and an inclined groove obliquely extending in the outer wall surface of the second barrel to be engaged with the guiding protrusions.

The second barrel may be rotatably coupled to the inner wall surface of the first barrel, the distance maintaining unit may include distance maintaining grooves extending in the circumferential direction in the outer wall surface of the second barrel and distance maintaining protrusions protruding from the inner wall surface of the first barrel to be inserted into the distance maintaining grooves, and the guiding unit may include guiding protrusions protruding from the outer wall surface of the second barrel and an inclined groove obliquely extending in the inner wall surface of the first barrel to be engaged with the guiding protrusions.

The second barrel may be rotatably coupled to an outer wall surface of the first barrel, the distance maintaining unit may include distance maintaining grooves extending in the circumferential direction in an outer wall surface of the first barrel and distance maintaining protrusions protruding from an inner wall surface of the second barrel to be inserted into the distance maintaining grooves, and the guiding unit may include guiding protrusions protruding from the outer wall surface of the first barrel and an inclined groove obliquely extending in the inner wall surface of the second barrel.

According to another aspect of the invention, there is provided an apparatus for adjusting a position of an optical element, the apparatus including: a first barrel having a hollow cylindrical shape, and including distance maintaining grooves extending in a circumferential direction in an inner wall surface, a guiding protruding unit protruding from the inner wall surface, and axial direction adjusting grooves extending in an outer wall surface to be inclined with respect to an axial direction; a second barrel having a hollow cylindrical shape to support the optical element, rotatably coupled to the inner wall surface of the first barrel, and including coupling protrusions protruding from an outer wall surface to be inserted into the distance maintaining grooves and an inclined groove obliquely extending in the outer wall surface to be engaged with the guiding protruding unit; and a third barrel disposed outside the first barrel to rotatably support the first barrel, and including axial direction adjusting protrusions inserted into the axial direction adjusting grooves.

BRIEF DESCRIPTION OF THE DRAWINGS

The above and other features and advantages of the invention will become more apparent by describing in detail exemplary embodiments thereof with reference to the attached drawings in which:

FIG. 6 is a side cross-sectional view of the apparatus in the state of FIG. 4;

FIG. 7 is a side cross-sectional view illustrating a state where the apparatus of FIG. 6 is adjusted;

DETAILED DESCRIPTION

The invention will now be described more fully with reference to the accompanying drawings, in which exemplary embodiments of the invention are shown.

Figure 1:
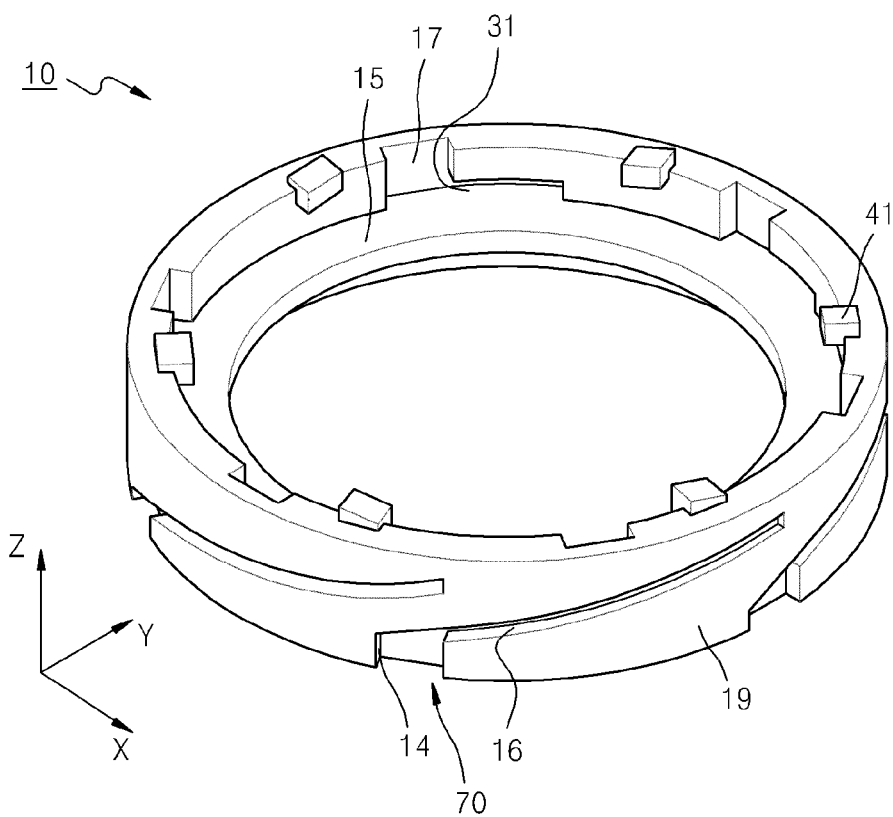
FIG. 1 is a perspective view illustrating a first barrel of an apparatus for adjusting a position of an optical element, according to an embodiment of the invention.
Figure 2:
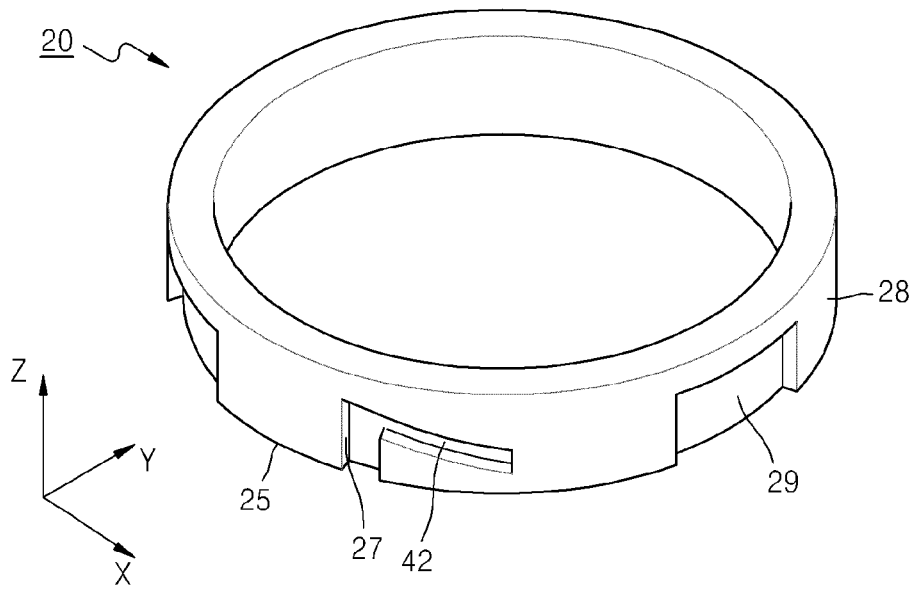
FIG. 2 is a perspective view illustrating a second barrel of the apparatus of FIG. 1.
Figure 3:
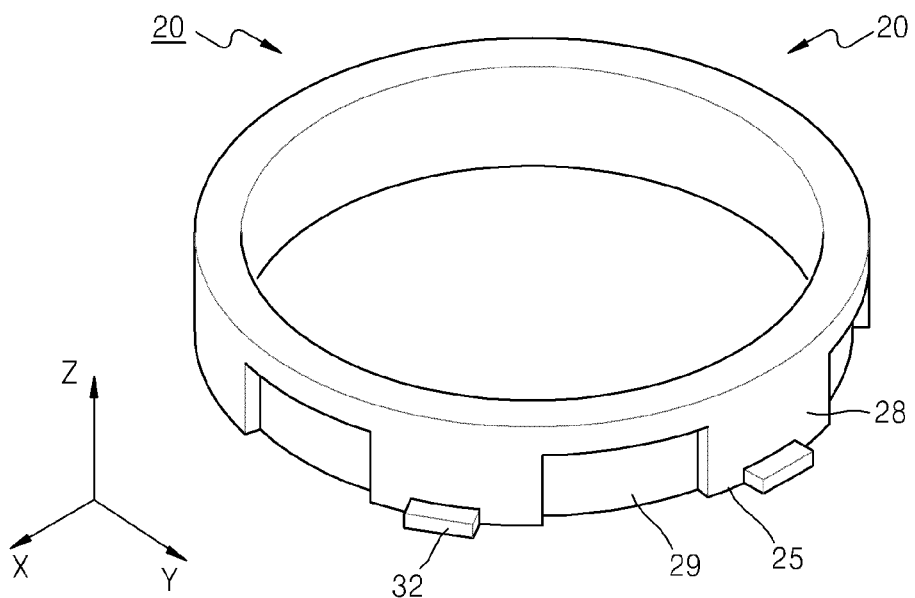
FIG. 3 is a perspective view illustrating the second barrel of FIG. 2 seen in a different direction.
Figure 4:
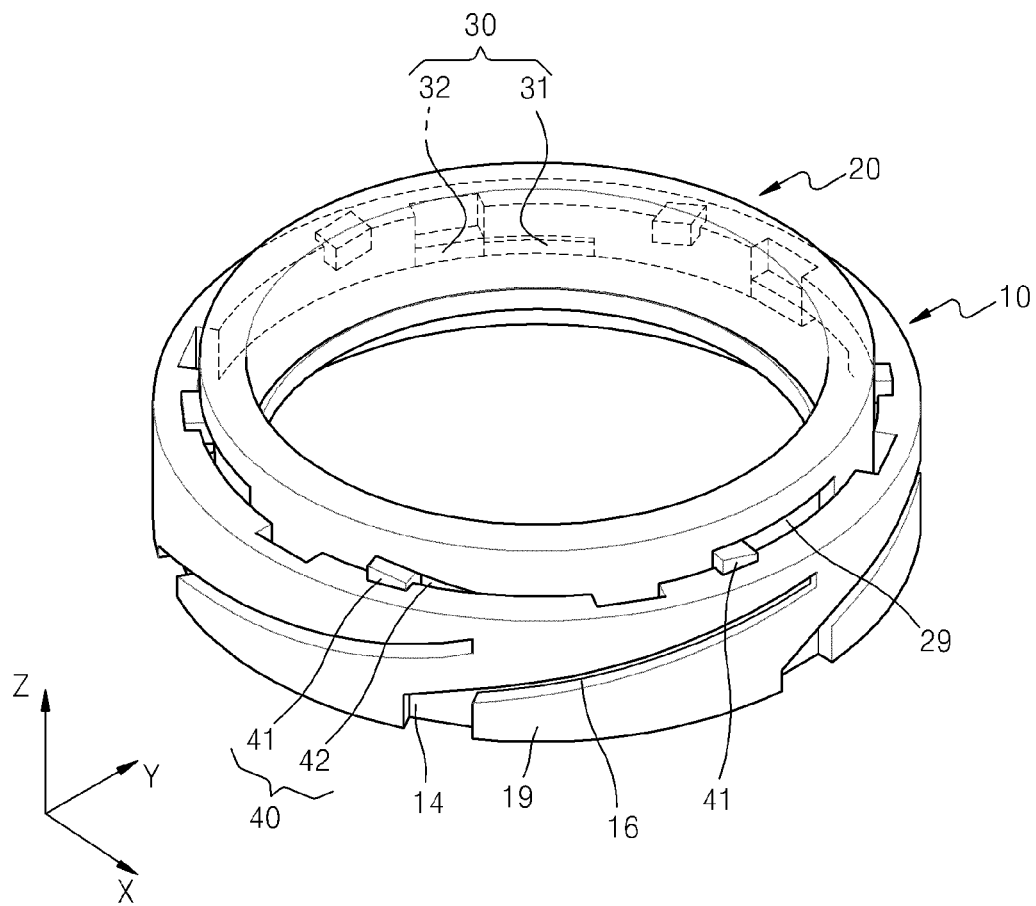
FIG. 4 is a perspective view illustrating a state where the first barrel of FIG. 1 and the second barrel of FIG. 2 are coupled to each other.

FIG. 1 is a perspective view illustrating a first barrel 10 of an apparatus for adjusting a position of an optical element 60, according to an embodiment of the invention. FIG. 2 is a perspective view illustrating a second barrel 20 of the apparatus of FIG. 1. FIG. 3 is a perspective view illustrating the second barrel of FIG. 2 seen in a different direction. FIG. 4 is a perspective view illustrating a state where the first barrel 10 of FIG. 1 and the second barrel 20 of FIG. 2 are coupled to each other.

Referring to FIGS. 1 through 4, the apparatus includes the first barrel 10, the second barrel 20 rotatably coupled to the first barrel 10, a distance maintaining unit 30 maintaining a distance between the first barrel 10 and the second barrel 20 in a first region of the first barrel 10, and a guiding unit 40 guiding a movement of the second barrel 20 to change a relative position of the second barrel 20 with respect to the first barrel 10 in a second region of the first barrel 10.

Figure 5:
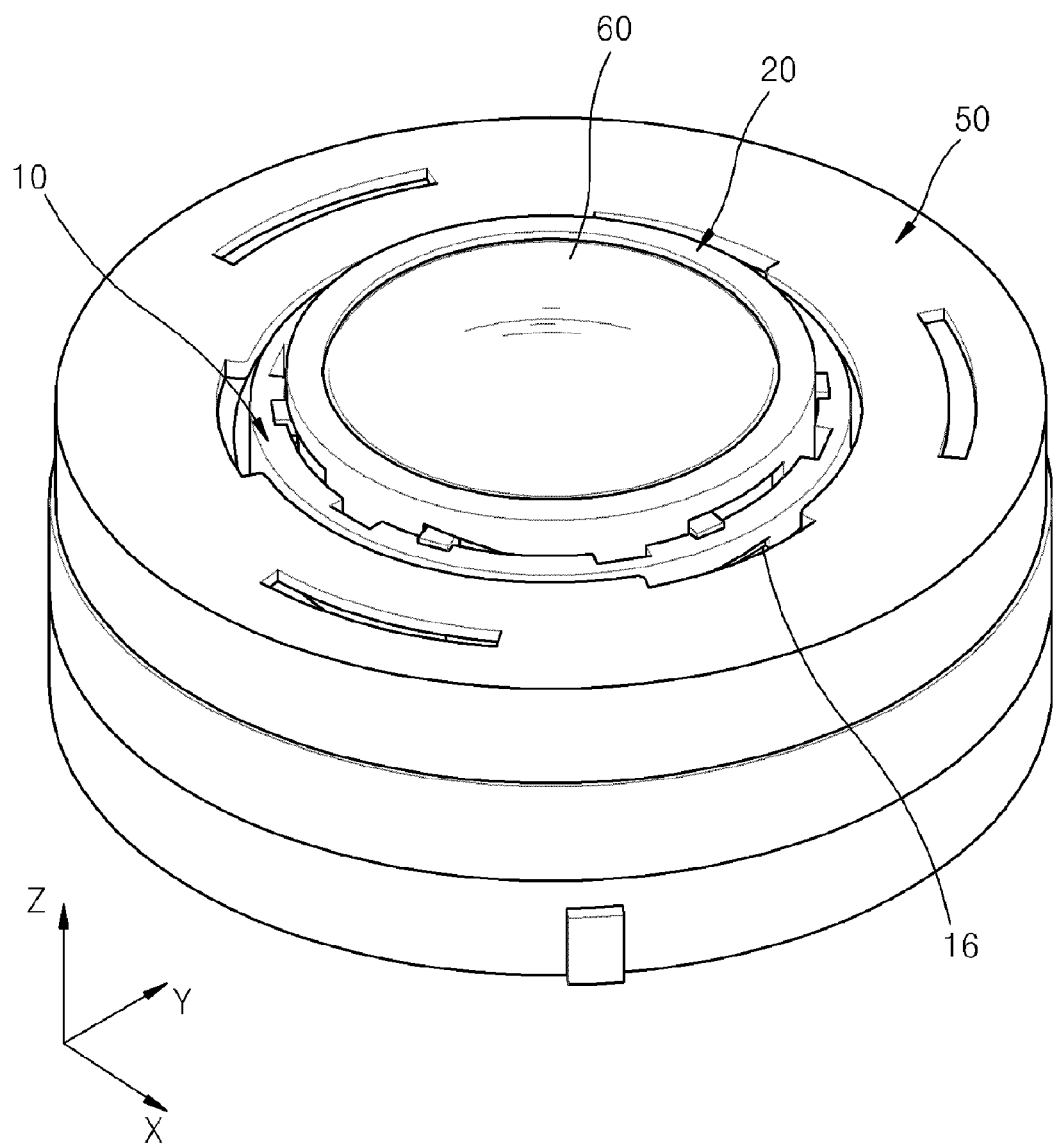
FIG. 5 is a perspective view for explaining an operation of the apparatus in the state of FIG. 4.

The first barrel 10 and the second barrel 20 are each formed of a predetermined material, such as a synthetic resin or a metal, and have a hollow cylindrical shape. The second barrel 20 supports the optical element 60 such as a lens as shown in FIG. 5. The second barrel 20 is rotatably coupled to the first barrel 10, and a relative position of the second barrel 20 with respect to the first barrel 10 may be adjusted as the second barrel 20 rotates relative to the first barrel 10.

The second barrel 20 is rotatably coupled to an inner wall surface 18 (see FIG. 6) of the first barrel 10. The distance maintaining unit 30 is installed between the first barrel 10 and the second barrel 20, and maintains a distance between the first barrel 10 and the second barrel 20 when the second barrel 20 rotates relative to the first barrel 10. The first barrel 10 includes a jaw portion 15 protruding inward from the inner wall surface 18 to extend in a circumferential direction and supporting an end surface 25 of the second barrel 20.

The distance maintaining unit 30 includes distance maintaining grooves 31 extending in the circumferential direction in the inner wall surface 18 of the first barrel 10 and distance maintaining protrusions 32 protruding from an outer wall surface 28 of the second barrel 20 to be inserted into the distance maintaining grooves 31.

A plurality of the maintaining grooves 31 are formed to be spaced apart from one another in the circumferential direction of the first barrel 10. Accordingly, when the second barrel 20 is coupled to the first barrel 10, the distance maintaining protrusions 32 are respectively inserted into the plurality of distance maintaining grooves 31.

Insertion grooves 17 are formed in the inner wall surface 18 of the first barrel 10. The insertion grooves 17 extend in an axial direction of the first barrel 10 to guide movements of the distance maintaining protrusions 32 when the second barrel 20 is coupled to the first barrel 10. First ends of the distance maintaining grooves 31 are connected to the insertion grooves 17.

A region of the first barrel 10 where the distance maintaining protrusions 32 of the second barrel 20 are inserted into the maintaining grooves 31 of the first barrel 10 is referred to as a first region. When the second barrel 20 rotates relative to the first barrel 10, since the distance maintaining protrusions 32 move along the distance maintaining grooves 31 while being inserted into the distance maintaining grooves 31 in the first region, a distance between the first barrel 10 and the second barrel 20 in the first region may be maintained.

The guiding unit 40 is installed between the first barrel 10 and the second barrel 20, and guides a movement of the second barrel 20 to change a relative position of the second barrel 20 with respect to the first barrel 10 when the second barrel 20 rotates relative to the first barrel 10.

The guiding unit 40 includes guiding protrusions 41 protruding from the inner wall surface 18 of the first barrel 10 and an inclined groove 42 obliquely extending in the outer wall surface 28 of the second barrel 20 to be engaged with the guiding protrusions 41.

A plurality of the guiding protrusions 41 are disposed to be spaced apart from one another along the inner wall surface 18 of the first barrel 10. Accordingly, when the second barrel 20 is coupled to the first barrel 10, the inclined groove 42 is coupled to any one of the plurality of guiding protrusions 41.

Referring to FIG. 2, an axial direction of the second barrel 20 is parallel to a Z-axis and passes through a center of the second barrel 20. The inclined groove 42 is formed to be inclined with respect to the axial direction of the second barrel 20.

The second barrel 20 includes receiving grooves 29 extending along the outer wall surface 28 of the second barrel 20 to receive remaining ones of the guiding protrusions 41 which are not engaged with the inclined groove 42. A length of each of the receiving grooves 29 corresponds to a width of the inclined groove 42. Accordingly, while the protruding protrusions 41 move along the inclined groove 42 since the second barrel 20 rotates relative to the first barrel 10, the remaining guiding protrusions 41 may move along the receiving grooves 29.

A region of the second barrel 20 where the guiding protrusions 41 of the first barrel 10 are inserted into the inclined groove 42 of the second barrel 20 is referred to as a second region. If the second barrel 20 rotates relative to the first barrel 10, since the guiding protrusions 41 each move along the inclined groove 42, the second barrel 20 moves farther away from the first barrel 10 in the second region. That is, a distance between the first barrel 10 and the second barrel 20 in the second region is increased, so that a relative position of the second barrel 20 with respect to the first barrel 10 is changed.

The guiding protrusions 41 are inclined to correspond to an inclination direction in which the inclined groove 42 is inclined. Since the inclined groove 42 is guided by the guiding protrusions 41 when the second barrel 20 rotates relative to the first barrel 10, a movement of the second barrel 20 may be guided such that the second barrel 20 is farther away from the first barrel 10 in the second direction.

An introduction groove 27 is formed in the outer wall surface 28 of the second barrel 20 and has a first end connected to an end portion of the inclined groove 42 and a second end opened at the end surface of the second barrel 20.

FIG. 5 is a perspective view for explaining an operation of the apparatus in the state of FIG. 4. FIG. 6 is a side cross-sectional view of the apparatus in the state of FIG. 4.

A third barrel 50 for rotatably supporting the first barrel 10 is disposed outside the first barrel 10. An axial direction adjusting unit 70 for changing a relative position of the first barrel 10 with respect to the third barrel 50 is further disposed between the first barrel 10 and the third barrel 50.

The axial direction adjusting unit 70 changes a relative position of the first barrel 10 with respect to the third barrel 50 when the first barrel 10 rotates relative to the third barrel 50.

The axial direction adjusting unit 70 includes axial direction adjusting grooves 16 extending in an outer wall surface 19 of the first barrel 10 to be inclined with respect to the axial direction of the first barrel 10, and axial direction adjusting protrusions 56 formed on the third barrel 50 to be inserted into the axial direction adjusting grooves 16.

When the first barrel 10 rotates relative to the third barrel 50, the first barrel 10 may move relative to the third barrel 50 in a Z-axis direction of FIG. 6. As such, since a position of the optical element 60 in the axial direction may be adjusted by changing a position of the first barrel 10 with respect to the first barrel 50 in the Z-axis direction, fine focusing is possible.

FIG. 7 is a side cross-sectional view illustrating a state where the position of the apparatus of FIG. 6 is adjusted.

In FIG. 6, an optical center (straight line $C_L$) of a lens coincides with a geometric center (straight line $C_O$) which is a center of both the first barrel 10 and the third barrel 50. In this state, if the second barrel 20 rotates relative to the first barrel 10, a distance between the second barrel 20 and the first barrel 10 is constantly maintained in the first region where the distance maintaining protrusions 32 are inserted into the distance maintaining grooves 31.

However, in the second region where the inclined groove 42 is engaged with one of the guiding protrusions 41, as the second barrel 20 rotates relative to the first barrel 10, the second barrel 20 is farther away from the first barrel 10. Accordingly, the optical center (straight line $C_L$) of the optical element 60 is inclined with respect to the geometric center (straight line $C_O$) of the first barrel 10 and the third barrel 50 as shown in FIG. 7. As such, a tilting degree of the optical element 60 may be precisely adjusted by rotating the second barrel 20 relative to the first barrel 10.

The guiding unit 40 and the distance maintaining unit 30 for coupling the first barrel 10 to the second barrel 20, and the axial direction adjusting unit 70 for coupling the first barrel 10 to the third barrel 50 are manufactured within a minute mechanical tolerance range. Accordingly, if a position of the optical element 60 is adjusted by rotating the second barrel 20 relative to the first barrel 10 and rotating the first barrel 10 relative to the third barrel 50, a state where the position of the apparatus is adjusted may be maintained due to a mechanical frictional force in the guiding unit 40 and the maintaining unit 30, and the axial direction adjusting unit 70.

If a position of the optical element 60 is completely adjusted, a state where the first barrel 10, the second barrel 20, and the third barrel 50 are coupled to one another may be fixed by applying a resin or an adhesive to the guiding unit 40 and the distance maintaining unit 30 and the axial direction adjusting unit 70.

An operation of rotating the second barrel 20 relative to the first barrel 10 or rotating the first barrel 10 relative to the third barrel 30 may be performed manually by an operator. However, the current embodiment is not limited thereto, and rotations of the first barrel 10 and the second barrel 20 may be automatically controlled by a driving unit.

For example, if a driving unit for applying a driving force to the second barrel 20 and a driving unit for applying a driving force to the first barrel 10 are used, the position of the optical element 60 may be automatically adjusted by applying an electrical signal to the driving units. The driving unit for driving the first barrel 10 or the second barrel 20 may be, for example, a motor driven by an electrical signal, and the first barrel 10 and the second barrel 20 may have screw surfaces to be engaged with screws tightened to a shaft of the motor.

Figure 8:
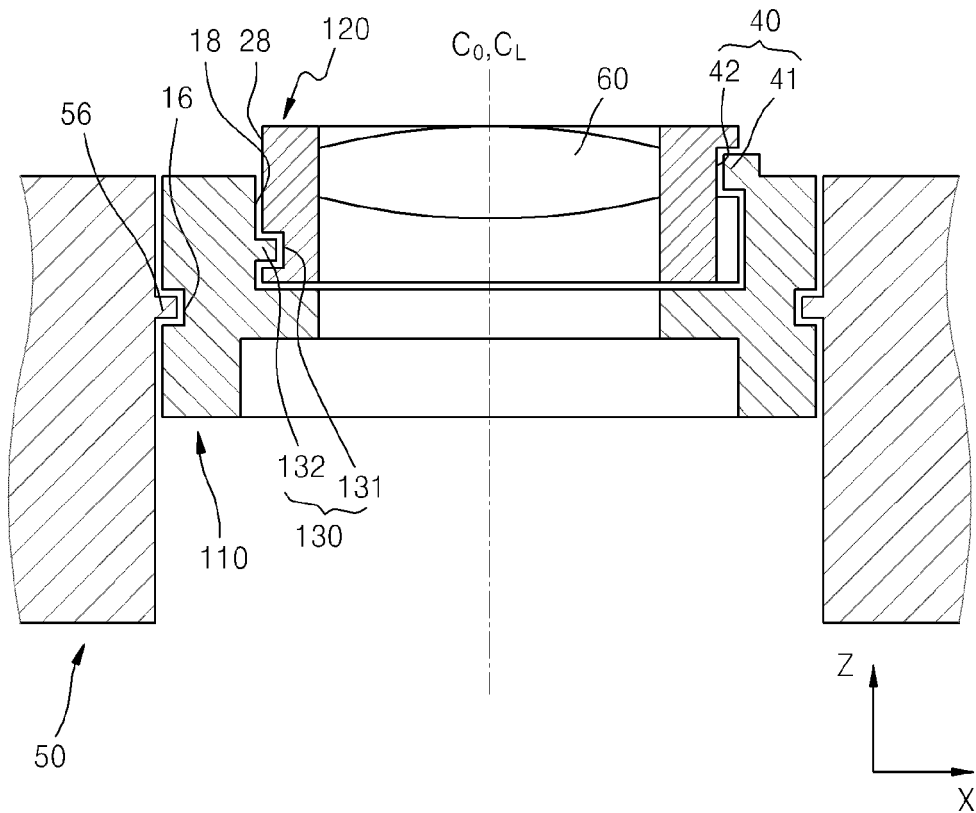
FIG. 8 is a side cross-sectional view of an apparatus for adjusting a position of an optical element, according to another embodiment of the invention.
Figure 9:
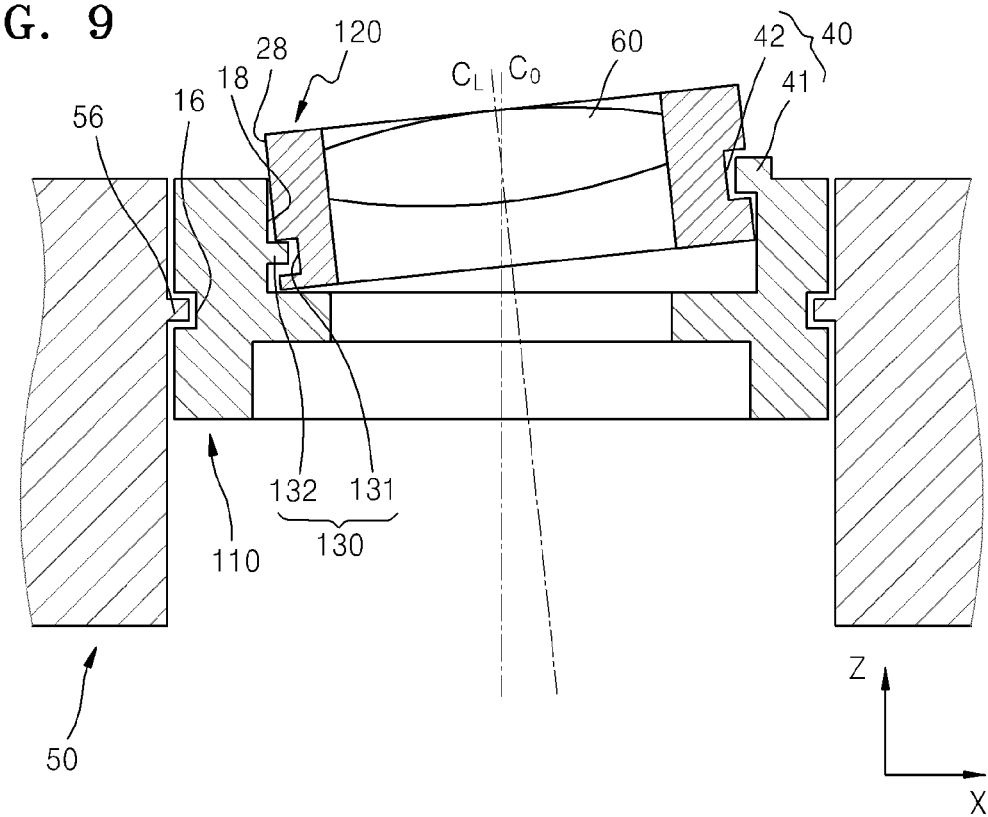
FIG. 9 is a side cross-sectional view illustrating a state where a position of an optical element of the apparatus of FIG. 8 is adjusted.

FIG. 8 is a side cross-sectional view of an apparatus for adjusting a position of the optical element 60, according to another embodiment of the invention. FIG. 9 is a side cross-sectional view illustrating a state where the apparatus of FIG. 8 is adjusted.

Referring to FIGS. 8 and 9, the apparatus includes a first barrel 110, a second barrel 120 supporting the optical element 60 and rotatably coupled to the first barrel 110, the third barrel 50 rotatably coupled to an outside of the first barrel 110, a distance maintaining unit 130 maintaining a distance between the first barrel 110 and the second barrel 120 in a first region of the first barrel 110, and the guiding unit 40 guiding a movement of the second barrel 120 to change a relative position of the second barrel 120 with respect to the first barrel 110 in a second region of the first barrel 110.

The apparatus illustrated in FIGS. 8 and 9 is structurally similar to the apparatus of FIGS. 1 through 7 except for a structure of the distance maintaining unit 130.

The distance maintaining unit 130 includes distance maintaining grooves 131 extending in a circumferential direction in the outer wall surface 28 of the second barrel 120, and distance maintaining grooves 132 protruding from the inner wall surface 18 of the first barrel 110 to be inserted into the distance maintaining grooves 131.

If the second barrel 120 rotates relative to the first barrel 110 in the first region where the distance maintaining protrusions 132 of the second barrel 120 are inserted into the distance maintaining grooves 131 of the first barrel 110, since the distance maintaining protrusions 132 move along the distance maintaining grooves 131 while being inserted into the distance maintaining grooves 131, a distance between the first barrel 110 and the second barrel 120 in the first region may be maintained.

Figure 10:
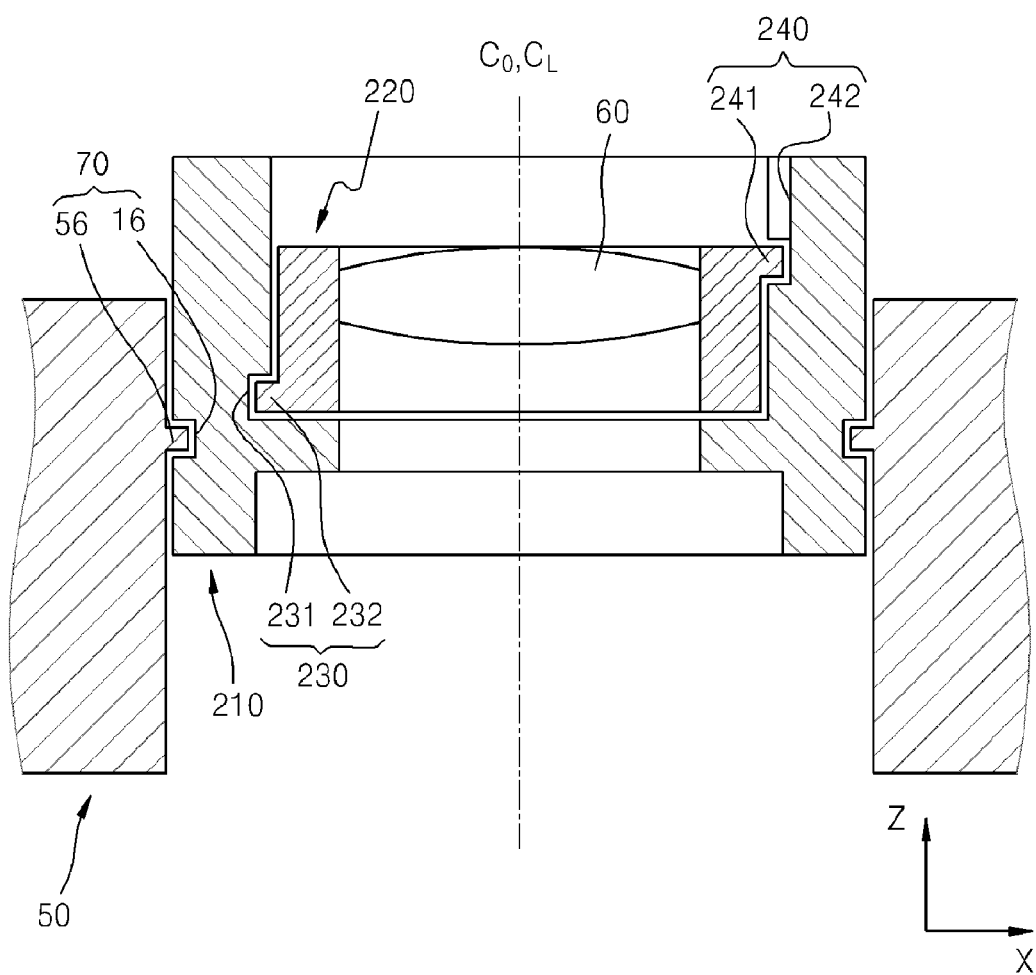
FIG. 10 is a side cross-sectional view of an apparatus for adjusting a position of an optical element, according to another embodiment of the invention.
Figure 11:
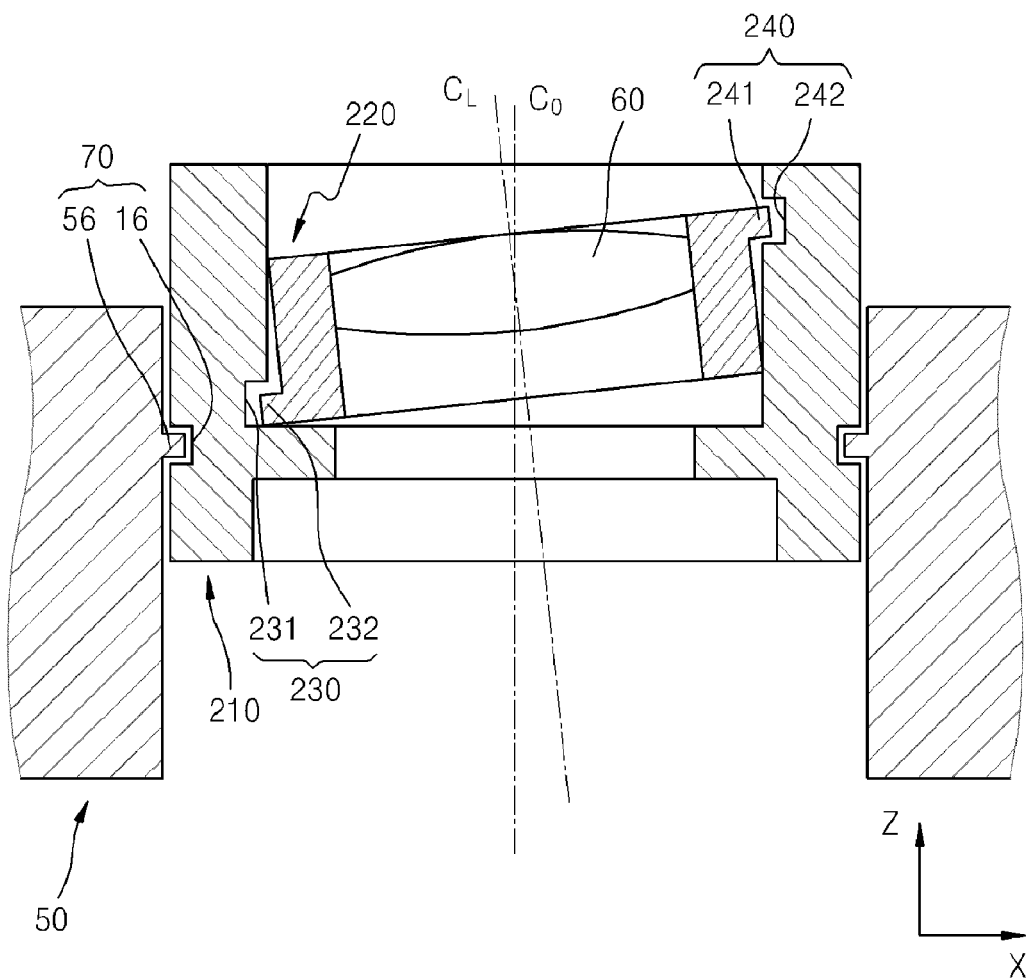
FIG. 11 is a side cross-sectional view illustrating a state where a position of an optical element of the apparatus of FIG. 10 is adjusted.

FIG. 10 is a side cross-sectional view of an apparatus for adjusting a position of the optical element 60, according to another embodiment of the invention. FIG. 11 is a side cross-sectional view illustrating a state where a position of the optical element 60 of the apparatus of FIG. 10 is adjusted.

Referring to FIGS. 10 and 11, the apparatus includes a first barrel 210, a second barrel 220 supporting the optical element 60 and rotatably coupled to the first barrel 210, the third barrel 50 rotatably coupled to an outside of the first barrel 210, a distance maintaining unit 230 maintaining a distance between the first barrel 210 and the second barrel 220 in a first region of the first barrel 210, and a guiding unit 240 guiding a movement of the second barrel 220 to change a relative position of the second barrel 220 with respect to the first barrel 210 in a second region of the first barrel 210.

The apparatus of FIGS. 10 and 11 is structurally similar to the apparatus of FIGS. 1 through 7 except for a structure of the guiding unit 240.

The guiding unit 240 includes guiding protrusions 241 protruding from an outer wall surface of the second barrel 220, guiding protrusions 241, and an inclined groove 242 obliquely extending in an inner wall surface of the first barrel 210 to be engaged with the guiding protrusions 241.

If the second barrel 220 rotates relative to the first barrel 210, since the guiding protrusions 241 move along the inclined groove 242 in the second region where one of the guiding protrusions 241 is inserted into the inclined groove 242 of the first barrel 210, the second barrel 220 moves farther away from the first barrel 210.

A structure of the distance maintaining unit 230 is similar to a structure of the distance maintaining unit 30 illustrated in FIGS. 1 through 7. The distance maintaining unit 230 includes distance maintaining grooves 231 extending in a circumferential direction in an inner wall surface of the first barrel 210, and distance maintaining protrusions 232 protruding from an outer wall surface 228 of the second barrel 220 to be inserted into the distance maintaining grooves 231.

Although a second barrel is rotatably coupled to an inside of a first barrel in the aforesaid embodiments, the invention is not limited thereto. That is, the second barrel may be rotatably coupled to an outside of the first barrel.

Also, although an axial direction adjusting unit is configured such that the first barrel moves in an axial direction relative to a third barrel in the aforesaid embodiments, the invention is not limited thereto and other modifications may be made. For example, axial direction adjusting protrusions may be formed on an outer wall surface of the first barrel and axial direction adjusting grooves into which the axial direction adjusting protrusions are inserted may be formed on an inner wall surface of the third barrel.

As described above, an apparatus for adjusting a position of an optical element according to the embodiments of the invention may precisely adjust a tilting degree of the optical element with a simple operation of rotating a second barrel relative to a first barrel, may adjust a position of the optical element in an axial direction with a simple operation of rotating the first barrel relative to a third barrel. Since additional components, such as set screws, washers, or springs, do not need to be installed in order to adjust the optical element, the apparatus may have a simple and compact design and may simply and easily adjust the optical element.

Also, if a driving unit for applying a driving force between the first barrel, the second barrel, and the third barrel, the apparatus may automatically adjust a position of the optical element without any manual operation.

In embodiments, the invention provides an apparatus for simply and easily adjusting a position of an optical element. In embodiments, the invention also provides an apparatus for adjusting a position of an optical element, the apparatus having a simple and compact structure. In embodiments, the invention also provides an apparatus for automatically adjusting a position of an optical element without any manual operation.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. An apparatus for adjusting a position of an optical element, the apparatus comprising:
   a first barrel having a hollow cylindrical shape;
   a second barrel having a hollow cylindrical shape configured to support the optical element and configured to be rotatably coupled to the first barrel;
   a distance maintaining unit installed between the first barrel and the second barrel in a first region of the first barrel and configured to maintain a distance between the first barrel and the second barrel in the first region if the second barrel rotates relative to the first barrel; and
   a guiding unit installed between the first barrel and the second barrel in a second region of the first barrel and configured to guide a movement of the second barrel to change a relative position of the second barrel with respect to the first barrel in the second region if the second barrel rotates relative to the first barrel.

2. The apparatus of claim 1, wherein the second barrel is rotatably coupled to an inner wall surface of the first barrel, the distance maintaining unit comprises distance maintaining grooves extending in a circumferential direction in the inner wall surface of the first barrel and distance maintaining protrusions protruding from an outer wall surface of the second barrel configured to insert into the distance maintaining grooves, and the guiding unit comprises guiding protrusions protruding from the inner wall surface of the first barrel and an inclined groove obliquely extending in the outer wall surface of the second barrel configured to engage with the guiding protrusions.

3. The apparatus of claim 2, wherein a plurality of the distance maintaining grooves and a plurality of the guiding protrusions are each disposed to be spaced apart from one another along the inner wall surface of the first barrel, and the second barrel comprises receiving grooves extending along the outer wall surface of the second barrel configured to receive guiding protrusions which are not engaged with the inclined groove.

4. The apparatus of claim 2, wherein the inclined groove is inclined with respect to an axial direction of the second barrel.

5. The apparatus of claim 4, wherein the guiding protrusions are inclined according to an inclination direction in which the inclined groove is inclined.

6. The apparatus of claim 2, wherein the first barrel further comprises a jaw portion protruding inward from the inner wall surface to extend in the circumferential direction, and supporting an end surface of the second barrel.

7. The apparatus of claim 2, wherein the second barrel further comprises an introduction groove formed in the outer wall surface of the second barrel and having a first end connected to an end portion of the inclined groove and a second end opened at an end surface of the second barrel.

8. The apparatus of claim 2, wherein the first barrel further comprises insertion grooves extending in an axial direction of the first barrel configured to guide movements of the maintaining protrusions if the second barrel is coupled to the first barrel, and wherein first ends of the distance maintaining grooves are connected to the insertion grooves.

9. The apparatus of claim 1, further comprising:
   a third barrel disposed outside the first barrel and configured to rotatably support the first barrel; and
   an axial direction adjusting unit installed between the first barrel and the third barrel and configured to change a relative position of the first barrel with respect to the third barrel when the first barrel rotates relative to the third barrel.

10. The apparatus of claim 9, wherein the axial direction adjusting unit comprises axial direction adjusting grooves extending in an outer wall surface of the first barrel to be inclined with respect to an axial direction of the first barrel, and axial direction adjusting protrusions formed on the third barrel configured to insert into the axial direction adjusting grooves.

11. The apparatus of claim 9, wherein the axial direction adjusting unit comprises axial direction adjusting grooves extending in an inner wall surface of the third barrel configured to incline with respect to an axial direction of the third barrel, and axial direction adjusting protrusions formed on the first barrel configured to insert into the axial direction adjusting grooves.

12. The apparatus of claim 2, wherein the second barrel is rotatably coupled to the inner wall surface of the first barrel, the distance maintaining unit comprises distance maintaining grooves extending in the circumferential direction in the outer wall surface of the second barrel and distance maintaining protrusions protruding from the inner wall surface of the first barrel configured to insert into the distance maintaining grooves, and the guiding unit comprises guiding protrusions protruding from the inner wall surface of the first barrel and an inclined groove obliquely extending in the outer wall surface of the second barrel configured to engage with the guiding protrusions.

13. The apparatus of claim 2, wherein the second barrel is rotatably coupled to the inner wall surface of the first barrel, the distance maintaining unit comprises distance maintaining grooves extending in the circumferential direction in the outer wall surface of the second barrel and distance maintaining protrusions protruding from the inner wall surface of the first barrel to be inserted into the distance maintaining grooves, and the guiding unit comprises guiding protrusions protruding from the outer wall surface of the second barrel and an inclined groove obliquely extending in the inner wall surface of the first barrel configured to engage with the guiding protrusions.

14. The apparatus of claim 2, wherein the second barrel is rotatably coupled to an outer wall surface of the first barrel, the distance maintaining unit comprises distance maintaining grooves extending in the circumferential direction in an outer wall surface of the first barrel and distance maintaining protrusions protruding from an inner wall surface of the second barrel to be inserted into the distance maintaining grooves, and the guiding unit comprises guiding protrusions protruding from the outer wall surface of the first barrel and an inclined groove obliquely extending in the inner wall surface of the second barrel.

15. An apparatus for adjusting a position of an optical element, the apparatus comprising:
- a first barrel having a hollow cylindrical shape, and comprising distance maintaining grooves extending in a circumferential direction in an inner wall surface, a guiding protruding unit protruding from the inner wall surface, and axial direction adjusting grooves extending in an outer wall surface to be inclined with respect to an axial direction;
- a second barrel having a hollow cylindrical shape to support the optical element, rotatably coupled to the inner wall surface of the first barrel, and comprising coupling protrusions protruding from an outer wall surface to be inserted into the distance maintaining grooves and an inclined groove obliquely extending in the outer wall surface configured to engage with the guiding protruding unit; and
- a third barrel disposed outside the first barrel to rotatably support the first barrel, and comprising axial direction adjusting protrusions configured to insert into the axial direction adjusting grooves.

* * * * *